(12) United States Patent
Singh

(10) Patent No.: US 7,991,544 B2
(45) Date of Patent: *Aug. 2, 2011

(54) SYSTEM AND METHOD FOR SELECTING AND PRESENTING A ROUTE TO A USER

(75) Inventor: Mona Singh, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/714,807

(22) Filed: Mar. 1, 2010

(65) Prior Publication Data

US 2010/0152999 A1 Jun. 17, 2010

Related U.S. Application Data

(63) Continuation of application No. 11/234,464, filed on Sep. 23, 2005, now Pat. No. 7,698,061.

(51) Int. Cl.
*G01C 21/34* (2006.01)

(52) U.S. Cl. ..... 701/200; 709/216; 709/219; 348/211.3; 340/995.23

(58) Field of Classification Search ............. 701/208, 701/209, 200, 211, 201; 340/905, 934, 995, 340/988, 995.19, 995.23; 709/216, 219; 348/211.3; *G01C 21/34*

See application file for complete search history.

(56) References Cited

U.S. PATENT DOCUMENTS

| | | |
|---|---|---|
| 5,177,685 A | 1/1993 | Davis et al. |
| 5,220,507 A | 6/1993 | Kirson |
| 5,371,678 A | 12/1994 | Nomura |
| 5,452,212 A | 9/1995 | Yokoyama |
| 5,528,501 A | 6/1996 | Hanson |
| 5,659,476 A | 8/1997 | LeFebvre et al. |
| 5,729,457 A | 3/1998 | Seymour |
| 5,790,976 A * | 8/1998 | Boll et al. ................ 455/456.5 |
| 5,987,380 A | 11/1999 | Backman et al. |
| 6,023,241 A | 2/2000 | Clapper |
| 6,047,235 A | 4/2000 | Hiyokawa et al. |

(Continued)

FOREIGN PATENT DOCUMENTS

JP 09-287970 4/1997

OTHER PUBLICATIONS

Dogru, Muzaffer, "Car Pooling With GIS Map Server and Web Services," Department of Information Technology, University of Zurich, Switzerland, Aug. 6, 2004, pp. 1-83.

(Continued)

*Primary Examiner* — Tuan C To

(57) ABSTRACT

A method and system are provided for selecting and presenting a route to a user. An exemplary embodiment includes storing a plurality of associations, each association between a route taken by a user and user characteristics. Received from a particular user is a request for at least one recommended route to a destination point. A query is formulated based on user specified parameters, including an origination point, the destination point, and characteristics of other users, to obtain routes taken by other users. A plurality of routes taken by other users having at least some of the characteristics of other users and related to at least one of the origination point and the destination point is retrieved from the stored plurality of associations. At least one recommended route is recommended to the particular user based on at least one of the retrieved routes that most closely matches the user specified parameters.

20 Claims, 8 Drawing Sheets

U.S. PATENT DOCUMENTS

| | | | |
|---|---|---|---|
| 6,098,015 A | 8/2000 | Nimura et al. | |
| 6,124,826 A | 9/2000 | Garthwaite et al. | |
| 6,127,945 A | 10/2000 | Mura-Smith | |
| 6,212,474 B1 | 4/2001 | Fowler et al. | |
| 6,249,742 B1 | 6/2001 | Friederich | |
| 6,282,492 B1* | 8/2001 | Gorai et al. | 701/209 |
| 6,321,158 B1 | 11/2001 | DeLorme et al. | |
| 6,324,467 B1 | 11/2001 | Machii et al. | |
| 6,339,746 B1 | 1/2002 | Sugiyama et al. | |
| 6,366,856 B1 | 4/2002 | Johnson | |
| 6,415,226 B1 | 7/2002 | Kozak | |
| 6,430,498 B1 | 8/2002 | Maruyama et al. | |
| 6,459,987 B1 | 10/2002 | Krull et al. | |
| 6,466,938 B1 | 10/2002 | Goldberg | |
| 6,477,526 B2* | 11/2002 | Hayashi et al. | 1/1 |
| 6,480,783 B1 | 11/2002 | Myr | |
| 6,484,092 B2 | 11/2002 | Seibel | |
| 6,505,118 B2 | 1/2003 | Chowanic | |
| 6,510,379 B1 | 1/2003 | Hasegawa et al. | |
| 6,539,080 B1 | 3/2003 | Bruce et al. | |
| 6,546,336 B1 | 4/2003 | Matsuoka et al. | |
| 6,577,949 B1 | 6/2003 | Robinson et al. | |
| 6,580,999 B2 | 6/2003 | Maruyama et al. | |
| 6,611,754 B2 | 8/2003 | Klein | |
| 6,654,681 B1 | 11/2003 | Kiendl et al. | |
| 6,662,105 B1 | 12/2003 | Tada et al. | |
| 6,694,252 B2 | 2/2004 | Ukita | |
| 6,721,650 B2 | 4/2004 | Fushiki et al. | |
| 6,721,653 B2 | 4/2004 | Watanabe | |
| 6,748,317 B2 | 6/2004 | Maruyama et al. | |
| 6,762,696 B2 | 7/2004 | Hulverscheidt et al. | |
| 6,765,998 B2 | 7/2004 | Bruce et al. | |
| 6,766,245 B2 | 7/2004 | Padmanabhan | |
| 6,778,903 B2 | 8/2004 | Robinson et al. | |
| 6,813,502 B2* | 11/2004 | Son et al. | 455/456.3 |
| 6,820,005 B2 | 11/2004 | Matsuda et al. | |
| 6,895,329 B1 | 5/2005 | Wolfson | |
| 6,961,658 B2 | 11/2005 | Ohler | |
| 7,096,233 B2 | 8/2006 | Mori et al. | |
| 7,243,134 B2 | 7/2007 | Bruner et al. | |
| 7,333,889 B2 | 2/2008 | Hashizume | |
| 7,424,363 B2* | 9/2008 | Cheng et al. | 701/211 |
| 7,590,486 B2* | 9/2009 | Okude et al. | 701/208 |
| 7,729,947 B1* | 6/2010 | Philbin et al. | 705/26.9 |
| 7,809,500 B2* | 10/2010 | Couckuyt et al. | 701/207 |
| 2001/0019309 A1* | 9/2001 | Saeki et al. | 340/995 |
| 2001/0044310 A1* | 11/2001 | Lincke | 455/456 |
| 2001/0047241 A1 | 11/2001 | Khavakh et al. | |
| 2001/0056325 A1 | 12/2001 | Pu et al. | |
| 2002/0070862 A1 | 6/2002 | Francis et al. | |
| 2002/0120396 A1 | 8/2002 | Boies et al. | |
| 2002/0128773 A1 | 9/2002 | Chowanic et al. | |
| 2002/0152020 A1 | 10/2002 | Seibel | |
| 2002/0165662 A1 | 11/2002 | Maruyama et al. | |
| 2003/0055558 A1 | 3/2003 | Watanabe et al. | |
| 2003/0109985 A1 | 6/2003 | Kotzin | |
| 2003/0182052 A1 | 9/2003 | DeLorme et al. | |
| 2003/0191584 A1 | 10/2003 | Robinson et al. | |
| 2003/0195695 A1 | 10/2003 | Maruyama et al. | |
| 2004/0117110 A1 | 6/2004 | Sasajima | |
| 2004/0158393 A1* | 8/2004 | Oonishi et al. | 701/201 |
| 2004/0172191 A1 | 9/2004 | Vitikainen | |
| 2004/0196163 A1 | 10/2004 | Takenaga et al. | |
| 2004/0225436 A1 | 11/2004 | Yoshihashi | |
| 2005/0043881 A1 | 2/2005 | Brulle-Drews et al. | |
| 2005/0060088 A1 | 3/2005 | Helal et al. | |
| 2005/0080556 A1* | 4/2005 | Toelle | 701/201 |
| 2005/0102098 A1 | 5/2005 | Montealegre et al. | |
| 2005/0102101 A1* | 5/2005 | Beesley et al. | 701/209 |
| 2005/0131628 A1 | 6/2005 | Peeters | |
| 2005/0192742 A1 | 9/2005 | Okochi | |
| 2005/0209773 A1* | 9/2005 | Hara | 701/201 |
| 2005/0246095 A1* | 11/2005 | Banet et al. | 701/208 |
| 2005/0256635 A1 | 11/2005 | Gardner | |
| 2005/0288859 A1 | 12/2005 | Golding | |
| 2006/0004512 A1 | 1/2006 | Herbst et al. | |
| 2006/0009907 A1* | 1/2006 | Kuroda et al. | 701/200 |
| 2006/0031007 A1 | 2/2006 | Agnew et al. | |
| 2006/0046740 A1 | 3/2006 | Johnson | |
| 2006/0069500 A1 | 3/2006 | Hashizume | |
| 2006/0069503 A1 | 3/2006 | Suomela et al. | |
| 2006/0080029 A1 | 4/2006 | Kodani et al. | |
| 2006/0080034 A1 | 4/2006 | Hayashi | |
| 2006/0129308 A1 | 6/2006 | Kates | |
| 2006/0203804 A1* | 9/2006 | Whitmore et al. | 370/352 |
| 2006/0217879 A1 | 9/2006 | Ikeuchi et al. | |
| 2006/0229802 A1 | 10/2006 | Vertelney et al. | |
| 2006/0247849 A1 | 11/2006 | Mohsini et al. | |
| 2006/0247852 A1* | 11/2006 | Kortge et al. | 701/209 |
| 2006/0265119 A1* | 11/2006 | McMahan et al. | 701/209 |

OTHER PUBLICATIONS

Marshall, M., "Destination Known," The Mercury News [online] (Sep. 27, 2004) [retrieved on Aug. 2, 2005] Retrieved from the Internet: <URL: http://www.mercurynews.com/mid/mercury-news/business/9770733.htm?1c> 2 pages.

"GPS Mapping Software"[online] Des Newman's OziExplorer [retrieved on Aug. 2, 2005] Retrieved from the Internet <URL: http://www.ozieplorer.com> 2 pages.

"Off Road Navigation"[online] Thales Navigation, Inc., 2005 [retrieved on Aug. 2, 2005] Retrieved from the Internet: <URL: http://www.magellangps.com/assets/manuals/newprod/manual_offroadnav.pdf> 21 pages.

"RFID in Japan, Crossing the Chasm, RFID Gets Bendy," Card Korea & Ubiquitous Biz Show 2005 in Seoul [online] (Mar. 17, 2005), [retrieved on Aug. 2, 2005] Retrieved from the Internet: <URL: http://ubiks.net/local/blog/jmt/archives3/003524.html> 2 pages.

\* cited by examiner

| Origin | Destination | Time of day | Day of week | Ur-gency | Vaca-tion | Sea-son | Route |
|--------|-------------|-------------|-------------|----------|-----------|---------|-------|
| Home | Ligon Middle | Morning | M-F | High | No | all | ………<br>……… |
| Home | Ligon Middle | Evening | M-F | High | No | all | ………<br>……… |
| Home | IPAC | Morning | M-F | High | No | all | ………<br>……… |
| Home | IPAC | Afternoon | Week-end | low | No | all | ………<br>……… |
| Home | IPAC | Evening | M-F | High | No | cold | ………<br>……… |
| Home | Toronto | Morning | F | Low | Yes | hot | ………<br>……… |

FIG. 4

SYSTEM AND METHOD FOR SELECTING AND PRESENTING A ROUTE TO A USER

CROSS-REFERENCE TO RELATED APPLICATIONS

This application is a Continuation application of U.S. patent application Ser. No. 11/234,464, filed Sep. 23. 2005, titled "System and Method for Selecting and Presenting a Route to a User," (now U.S. Pat. No. 7,698,061, issued Apr. 13, 2010, which is commonly owned with this application and is herein incorporated by reference.

TECHNICAL FIELD

The present invention relates to navigation systems, and more particularly to a system and method for selecting and presenting multiple routes to a user obtained from the user's peers.

BACKGROUND

The use of navigation systems to provide users with routes from one point to another point, such as those used in automobiles and mapping websites, is widespread. The use of navigation systems on cell phones and PDAs is one of the fastest growth application segments. Navigation systems are also available that are capable of calculating the shortest route for the user. Some navigation systems allow the user to specify route parameters like "avoid highways" and then present the user with a route that avoids highways.

Most navigation systems use static information, such as maps, to generate route and direction information. However, techniques are emerging for incorporating dynamic data into routing. For example, an article entitled "*Car Pooling With GIS Map Server and Web Services*," by Muzaffer Dogru, Department of Information Technology, University of Zurich, Switzerland, Aug. 6, 2004, describes an approach by which "demanders" (people who need a ride to go somewhere) can be matched with "offerers" (people who are able to offer a ride). The demanders and offerers can specify not only the end points of their routes but also via locations, which are locations that each person will pass through along their routes. The purpose is to combine multiple routes from different offerers to enable a demander to travel from one point to another through some desired via locations. The end points and via locations of the demander can be thought of as specifying a route. A match occurs even if one or more offerers will be traveling in a synchronized manner across those via locations so that the demander could hitch a ride with them from point to point.

Although the approach taken by Dogru is an intriguing one, one disadvantage is that Dogru's approach may fail to meet the needs of some users. That is, rather than hitching rides with others to get from one point to another, users may rather know which of a number of proposed routes to get from one point to another they should seriously consider based on the routes of others. Using Dogru's approach, only the future or proposed routes of the offerers would be available for use in such an analysis. An unintended consequence of this approach is that it may compromise the offerers' privacy since their current plans may be revealed to others. In addition, it would be desirable to reinforce which routes the user should take based on long-term past historical data, rather than proposed or future route data.

SUMMARY

A method and system are provided for selecting and presenting a route to a user. An exemplary embodiment includes storing a plurality of associations, each association between a route taken by a user and characteristics of the user. Received from a particular user is a request for at least one recommended route to a destination point. A query is formulated based on user specified parameters, including an origination point, the destination point, and characteristics of other users, to obtain routes taken by other users. A plurality of routes taken by other users having at least some of the characteristics of other users and related to at least one of the origination point and the destination point is retrieved from the stored plurality of associations. At least one recommended route is recommended to the particular user based on at least one of the retrieved routes that most closely matches the user specified parameters.

According to the method and system disclosed herein, the user can determine what routes other people in their peer group have taken to get from one place to another.

BRIEF DESCRIPTION OF THE DRAWINGS

FIG. 4 is a diagram showing an exemplary embodiment of a table for storing route information.

DETAILED DESCRIPTION

The present invention relates to selecting and presenting a route to a user. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Users of navigation systems are able to obtain one or more proposed routes from service providers. However, many times, what users really want to know are the routes that other people similar to themselves or similarly situated to themselves are actually taking to get from one place to another. For example, consider the following scenario. Imagine a person is going to a basketball game. The person queries a navigation system and the system provides the person with the shortest route. However, there are several routes that may be taken of getting to the stadium. The person knows some of their friends take a route that takes them right to the parking lot.

What the person wishes he or she knew at that moment is what routes that other people who are going to the game are taking or the routes that people usually take to go to the stadium. The person may also like to know in relative terms how many people take each of those routes and the types of people that take those routes.

Accordingly, a system and method are described whereby a user can request the routes that peers, identified using characteristics of the users, have taken to go from one point to another. The method comprises storing the routes that users have taken in the past, formulating queries to determine which peer to obtain routes from, aggregating the routes collected from peers in response to the query, and presenting the best routes to the user based on the routes collected from peers.

Figure 1:
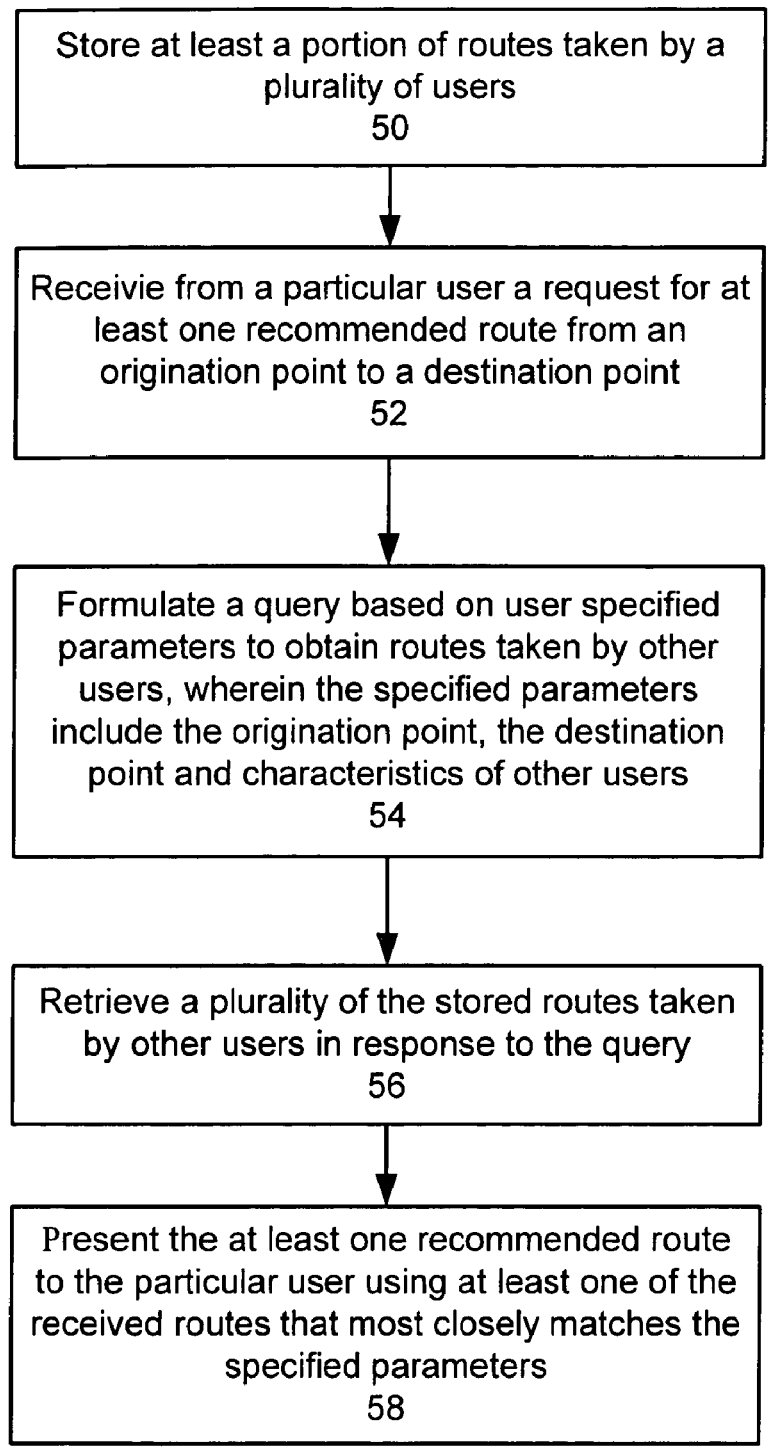
FIG. 1 is a flow diagram illustrating a process for selecting and presenting multiple routes to the user obtained from the user's peers in accordance with an exemplary embodiment.

FIG. 1 is a flow diagram illustrating a process for selecting and presenting multiple routes to the user obtained from the user's peers in accordance with an exemplary embodiment. In block 50, at least a portion of routes taken by a plurality of users is stored. In one embodiment, the routes of each user may be recorded by navigation devices of each of the users while the user is traveling using in-vehicle navigation systems, or personal digital assistants (PDAs). In an alternative embodiment, the users may use a computer to manually enter the routes they have taken from an origin to a destination. The recorded routes may be either stored locally on each of the navigation devices or uploaded to a server for storage.

In block 52, a request from a particular user is received for at least one recommended route from an origination point to a destination point. In block 54, a query is formulated based on user specified parameters to obtain routes taken by other users, where the specified parameters include the origination point, the destination point and characteristics of other users. In block 56, a plurality of the stored routes taken by other users having at least some of the characteristics of other users and related to at least one of the origin and destination are retrieved in response to the query. In block 58, at least one recommended route is presented to the user using at least one of the received routes that most closely matches the specified parameters.

According to the exemplary embodiment, the characteristics of other users specified by the user are used to filter the number of potential other users that have traveled between the origin and destination so that the routes are only obtained from users in a particular peer group. For example, people are often puzzled about which of a number of possible routes they should consider seriously. The motivations can be as simple as knowing what others are doing to have a feeling of comfort about one's decision in favor or against a particular route. Often, underlying these are some specific motivations. For example, some useful characteristics may be naturally associated with several different proposed routes, including the total number of people that have taken each route; the number of people that have taken each route the user knows personally; and the number of people in the user's peer group that have taken the routes. The user may specify the characteristics of other users of a particular peer group by specifying demographic parameter values in a demographic profile, which may include parameters such as name, address, sex, age, driving experience, number of children, schools the children attend, and the like. For example, a school parent may wish to know what routes other parents choose to drop or pick up their children from a particular school. Along the same lines, a women may feel more comfortable knowing what routes have been taken by other women, especially their friends. Likewise, other groups—such as men, or older drivers, or beginning drivers—may prefer routes based on their own characteristics or demographic profile. The underlying motivation would be that it improves the odds of a selected route having some relevant attribute that would appeal to them.

Besides the characteristics or demographic profile of other users, the user may formulate queries to obtain a recommended route based on parameters of the routes themselves such as the following:

a. Quickness (or shortness).

b. Personal Safety—quick or short routes might not feel safe to the user because they go through crime-ridden parts of town; route with the easiest approach because some routes arrive at the destination from a direction that makes it easier to enter, park, or return.

c. Traffic safety—some routes go through accident-prone or stressful intersections and are good to avoid, especially during rush hour.

d. Road conditions—some routes go on streets that are prone to poor conditions. For example, in Raleigh, a stretch of Avent Ferry Road frequently floods during a rainstorm.

e. Police activity—some stretches of roads have excessive police activity, which also can be more or less desirable for different people.

Figure 2A:
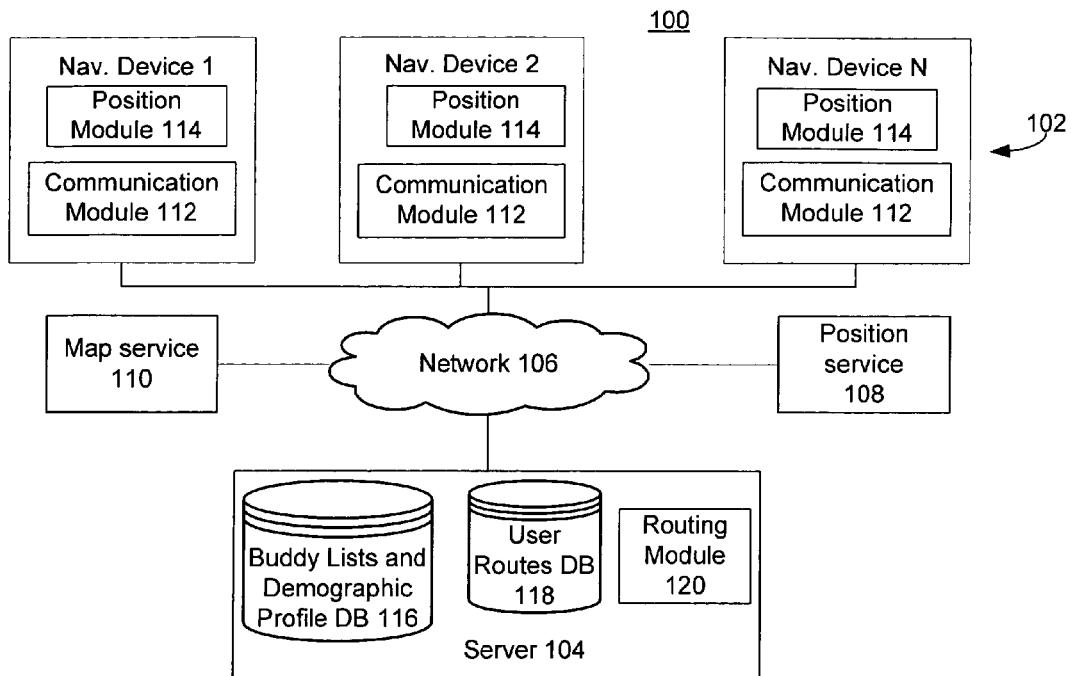
FIGS. 2A and 2B are block diagrams illustrating a system for selecting and presenting a route to a user. The routes may be selected according to two embodiments.
Figure 2B:
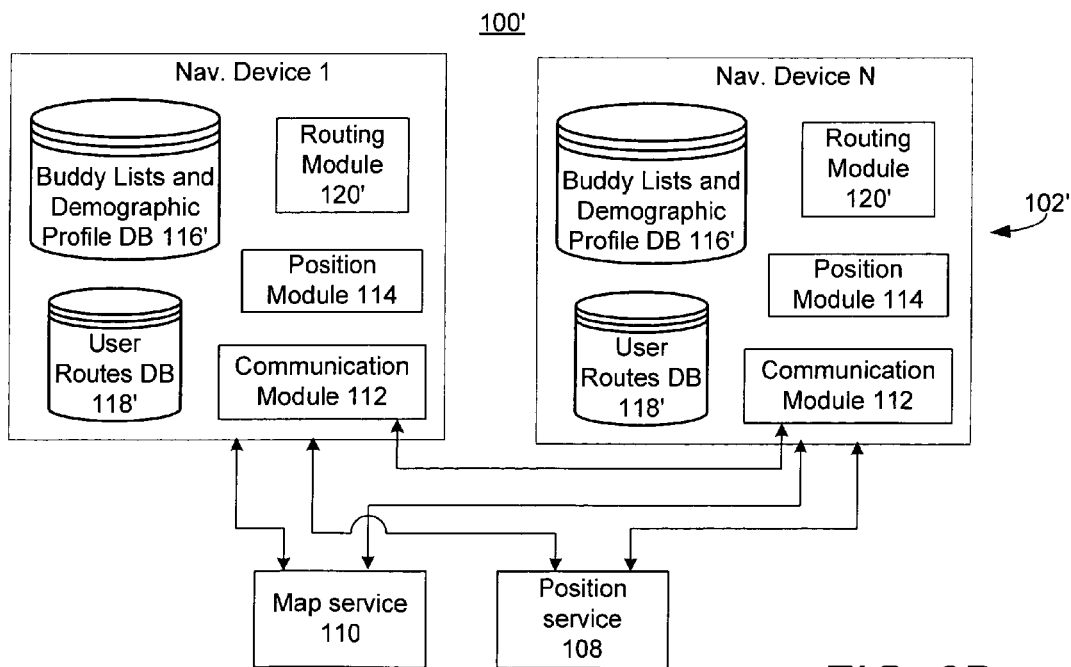

FIGS. 2A and 2B are block diagrams illustrating a system for selecting and presenting a route to a user. The routes may be selected according to two embodiments. FIG. 2A illustrates a server-based system 100 in which user navigation devices 102 record the routes traveled by their respective users and upload the routes to a server 104 over a network 106, such as the Internet, for storage. Each navigation device 102 is capable of querying the server 104 to obtain the routes taken by the other users. FIG. 2B illustrates a peer-to-peer system 100' in which the navigation devices 102' locally store their recorded routes and each device 102' is capable of communicating with, and querying, the other navigation devices 102' to obtain the routes taken by other users.

Referring to FIG. 2A, each of the navigation devices 102 may communicate over the network 106 with a position service 108 that provides information about the device's position, and a map service 110 that provides information about street maps in the areas of relevance to the device 102. Each of the navigation devices 102 preferably includes a communication module 112 with which the device 102 communicates with other devices, and a position module 114 for determining the current position of the device 102. The position module 114 preferably utilizes a global position system (GPS). Alternatively, the position-determining equipment, such as position module 114, could reside external to the device 102 in the network 106.

Each of the navigation devices 102 includes a user interface (not shown) for receiving data indicating an origination point and destination point. The origination point and destination point may be input by the user prior to recording a route traveled by the user, or for querying the navigation device 102 for recommended routes between origination and destination points. Each user of the navigation devices 102 may also enter data specifying a group of users with whom the user's routes may be shared and for whom the routes may be requested. The group of users specified by each user may be stored in a buddy list. Each user of the navigation devices 102 may also enter data specifying the user's own demographic profile. Each user's buddy list, user characteristics, and/or demographic profile are uploaded to the server 104 and stored in a buddy list and user characteristic/demographic profile database 116 for all users. During travel of each user, the respective navigation devices 102 may record the routes traveled by the users using the position module 114, the position service 108, and the map service 110, as described below. The recorded route is then uploaded to the server 104 and stored in a user route database 118 for all users. When requesting a recommended route, a user of the navigation device 102 enters the desired origination point and the destination point, any desirable characteristics of the requested route, and any characteristics of the target peer group. The request and the user characteristics are then uploaded to the server 104. A routing module 120 on the server 104 is configured to select and present desirable routes to the user.

Referring to FIG. 2B, in the peer-to-peer system 100', each of the navigation devices 102' includes the communication module 112 and the position module 114, which operate in conjunction with the position service 108 and the map service 110, as described above. However, in the peer-to-peer system 100', each of the navigation devices 102' is capable of communicating with the other navigation devices 102'. Each of the user's buddy list and demographic profile, and traveled routes are stored locally on each corresponding navigation system 102' in a buddy list and demographic profile database 116' and a user routes database 118', respectively. In addition, each of the navigation devices 102' includes a routing module 120' to select and present desirable routes to its user, as described below with reference to FIGS. 7A and 7B.

Figure 3:
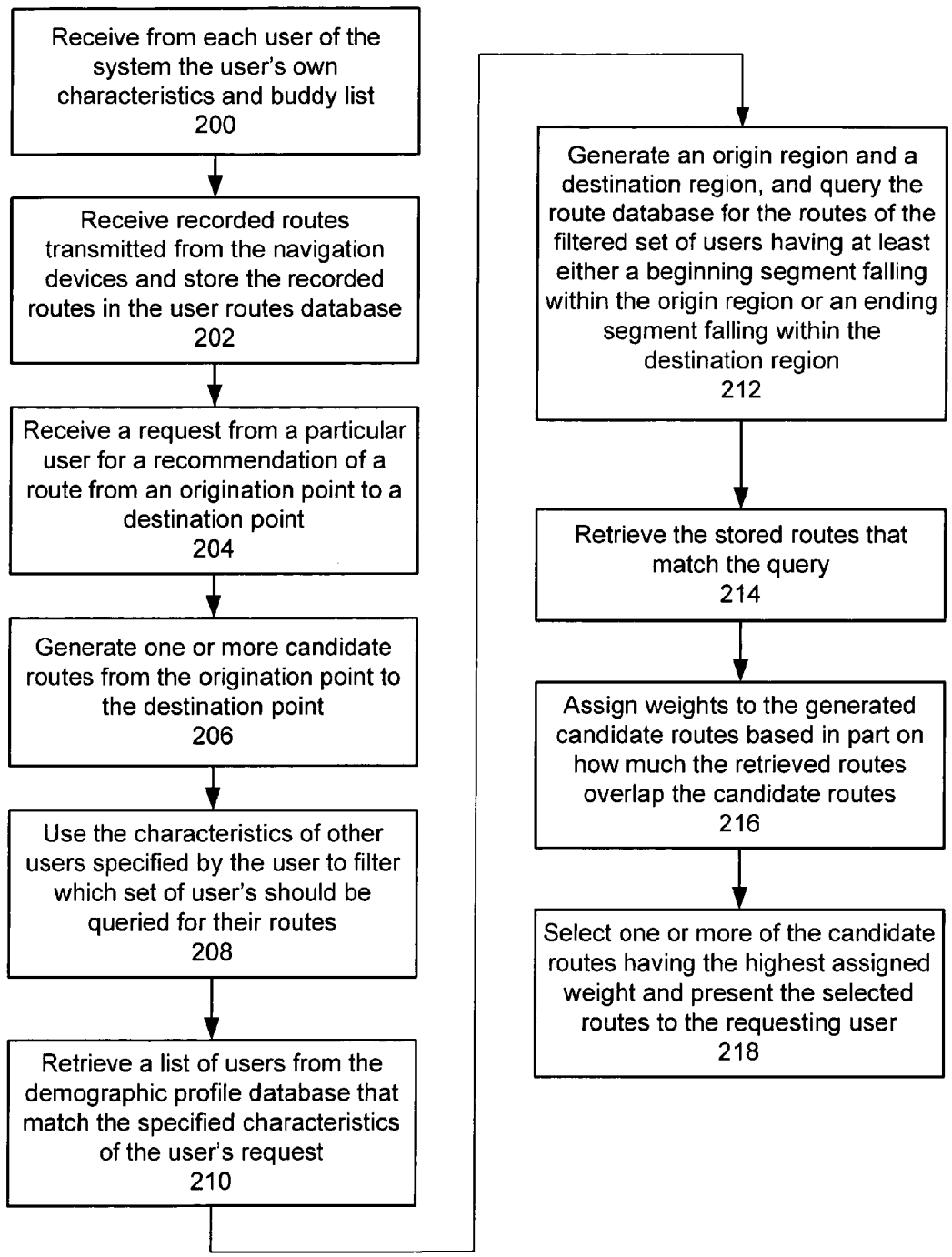
FIG. 3 is a flow diagram illustrating the process of selecting and presenting desirable routes to a user in accordance with a server-based embodiment.

FIG. 3 is a flow diagram illustrating the process of selecting and presenting desirable routes to a user in accordance with a server-based embodiment. Referring to both FIGS. 2A and 3, the process begins in block 200 in which the server 104 receives from each user of the system 100 the user's own demographic profile, and buddy list, if any. In a preferred embodiment, the demographic profile is stored as metadata that is associated with the user's instant messaging (IM) identity. In an alternative embodiment, the user enters the demographic profile and buddy list through their navigation devices 102 or by accessing the server 104 through a Web browser running on a computer (not shown).

In block 202, the server 104 receives recorded routes transmitted from the navigation devices 102 and stores the recorded routes in the user routes database 118 in association with the user who submitted the record route. In an exemplary embodiment, the position module 114 uses data from position service 108 and the map service 110 to record turns made on a street map as the navigation device 102 moves around. For frequent origination and destination points, the sequence of typical turns is thus recorded. In the preferred embodiment, the routes may be stored as a table of the format shown in FIG. 4. Each record in the table corresponds to a particular recorded route and information recorded for each route may include the origin, destination, time of day, day of week, urgency, vacation, season, and road segments and turns of the route, for example.

Referring again to FIG. 3, after routes of users have been stored by the server 104, in block 204 the server 104 receives a request from a particular user for a recommendation of a route from an origination point to a destination point. The request may originate either from the user's navigation device 102 or from a Web browser. In an exemplary embodiment, the request includes not only the origination and destination points, but also any desirable characteristics of the requested route and the characteristics identifying a particular peer group. For example, the user could request recommended routes that were taken by a demographic group—such as women, men, teenagers,—older drivers,—whose choices the user finds valuable to know. In an alternative embodiment, the server 104 inserts the characteristics of other users into the request based on previous settings of the user.

In block 206, the server 104 generates one or more candidate routes from the origination point to the destination point using conventional route solution techniques. In block 208, the server 104 uses the characteristics specified by the user to filter which set of user's should be queried for their routes. Since the routes that may be selected in response to the user's request may be selected from a potentially large set, the exemplary embodiment uses request characteristics, such as the demographic parameters, as a basis for making the appropriate selection of routes and reducing the potentially large number of retrieved routes.

In block 210, the server's routing module 120 retrieves a list of users from the buddy list and demographic profile database 116 that match the specified characteristics of the user's request. In block 212, the routing module 120 generates an origin region around the origination point and generates a destination region around the destination point, and queries the route database 118 for the routes of the filtered set of users having at least either a beginning segment falling within the origin region or an ending segment falling within the destination region. Alternatively, the query may request routes having intermediate segments that pass through the origin region and the destination region.

In block 214, the routing module 120 retrieves the stored routes that match the query. In block 216, the routing module 120 assigns weights to the generated candidate routes based in part on how much the retrieved routes overlap the candidate routes. In one embodiment, the weight assigned to the generated candidate routes is proportional to the distance at least one of the retrieved routes overlaps the candidate route. In a second embodiment, the weight assigned to each generated candidate route is proportional to a number of street segments of one of the retrieved routes overlaps the candidate route.

Figure 5A:
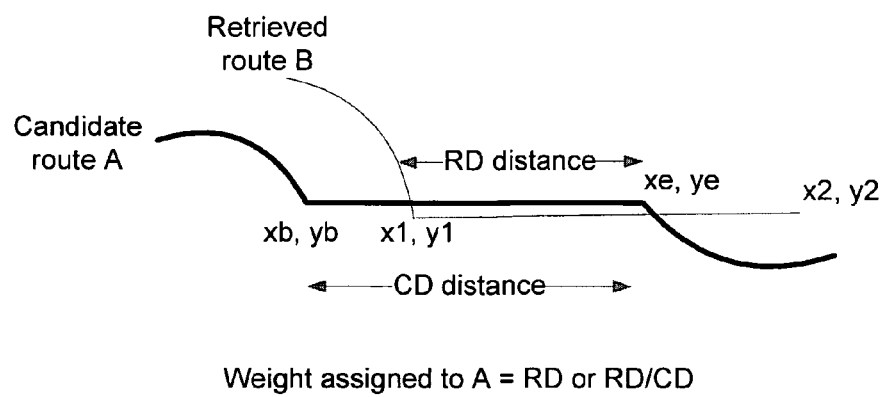
FIG. 5A is a diagram illustrating a third embodiment for determining the weight assigned to a candidate route given an overlapping user route.

FIG. 5A is a diagram illustrating a third embodiment for determining the weight assigned to a candidate route given an overlapping user route. The example shows a generated candidate route A and a retrieved route B from the user route database 118. The candidate route A includes a segment bounded by points xb, yb and xe, ye. The retrieved route B includes a segment bounded by points x1, y1 and x2, y2 that partially overlaps the segment from the candidate route A. To determine the weight to assign to the candidate, route A based on the partially overlapping segment from the retrieved route B, the distance of the candidate route, CD, is calculated. The distance, RD, that the segment of the retrieved user route B overlaps with the segment of the candidate route A is also calculated. Finally, a value is assigned to the weight that is equal to either the overlapping distance of the retrieved route segment, RD, or the overlapping distance of the retrieved route segment divided by the total distance of the candidate route (RD/CD).

Referring again to FIG. 3, after all weights have been assigned to the candidate routes, in block 218, the routing module 120 selects one or more of the candidate routes having the highest assigned weights and presents the selected routes to the requesting user by transmitting the selected route to the user's navigation device 102, or to the user's web browser. The presentation of the recommended routes may be displayed in the user interface by a variety of ways. For example, an indication of the number of users taking a recommended route can be shown explicitly by displaying a text number, or graphically by the thickness of the route shown on a map.

Figure 6:
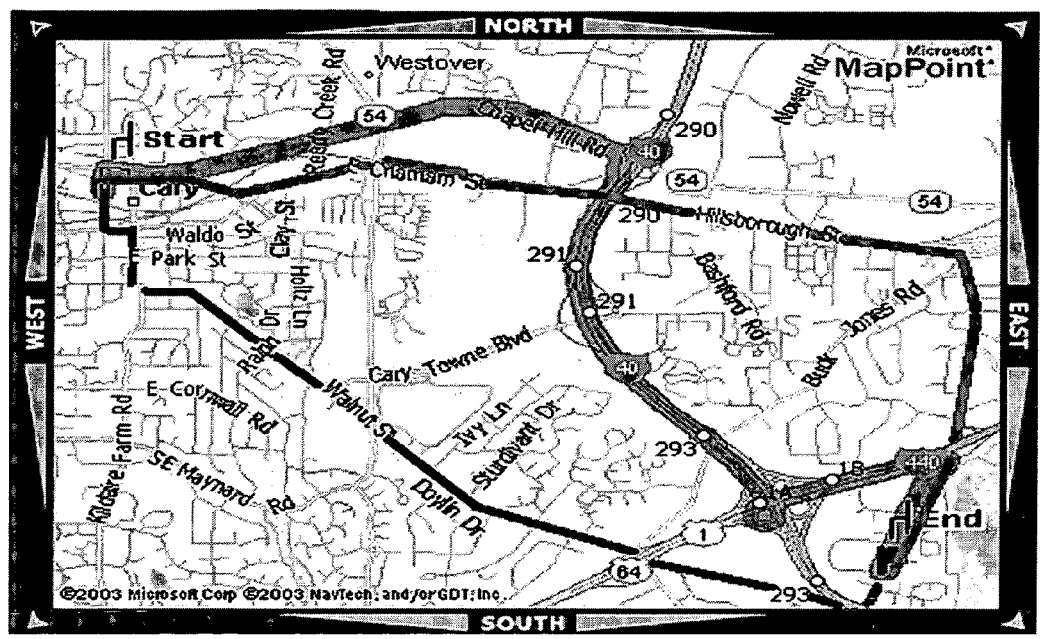
FIG. 6 is a diagram illustrating an example user interface in which multiple routes are shown from a specified origin to a specified destination.

FIG. 6 is a diagram illustrating an example user interface in which multiple routes are shown from a specified origin to a specified destination. In this example, three recommended routes are shown with lines of various thickness and colors.

Other embodiments include showing routes generated from information provided by all the users; showing the routes generated from the information provided by the filtered set of users who satisfy the filtering requirement based on the characteristics listed above; and with suitable authorization, showing the identities of the users who have taken specific route segments. Depending on the user interface, other route attributes can be presented to the user, such as the average time for the recommended routes.

Figure 5B:
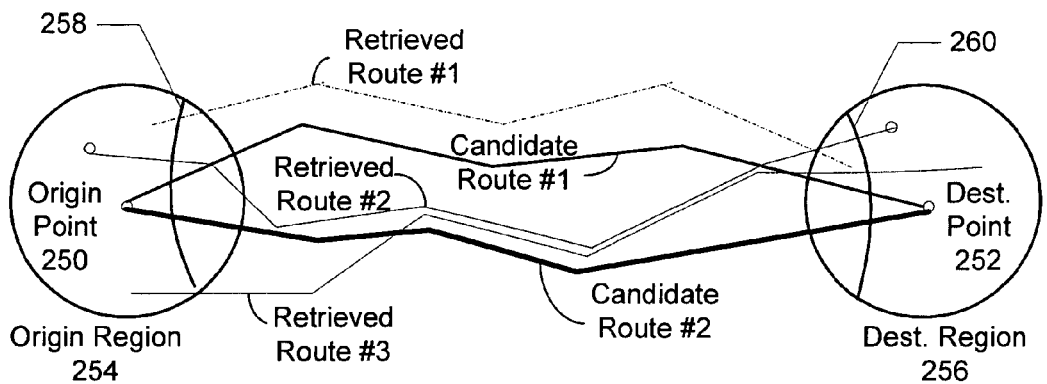
FIG. 5B is a diagram illustrating an exemplary graphic representation of how generated candidate routes are assigned weights based on retrieved routes of other users.

FIG. 5B is a diagram illustrating an exemplary graphical representation of how generated candidate routes are assigned weights based on the retrieved routes of other users. In the example shown, two generated candidate routes have been generated by the routing module 120 between origination point 250 and destination point 252, and three retrieved routes, #1, #2, and #3 have been obtained from the route database 118 in response to the query.

In the example shown, the candidate route #2 is weighted because some of the segments of retrieved routes #2 and #3 overlap with the segments of candidate route #2. Because the segments of candidate route #1 are not overlapped by any retrieved routes, candidate route #1 is not weighted, and candidate route #2 is selected and presented to the user.

In a preferred embodiment, the query to retrieve a set of routes from the route database may be formulated as follows. First, a radius r is calculated based on a predetermined percentage of a distance between the origination point 250 and the destination point 252. In one embodiment, 0.1 of the distance between the origination point 250 and the destination point 252 may be used, for example. Next, the origin region 254 is calculated by generating a circle centered around the origination point 250 having the radius r. Similarly the destination region 256 is calculated by generating a circle centered around the destination point 252 having the radius r.

Next, arcs 258 and 260 that cut the origin and destination regions 254 and 256 are created having radii centered on the opposite point. That is, the arc 258 cutting the origin region 254 is centered at the destination point 252, and the arc 260 cutting the destination region 256 is centered at the origination point 250. To create the arcs, a radius R is determined that has a length close to, but less than the distance from the origination point 250 to the destination point 252 (referred to as the OD distance). For example, R may be set equal to the OD distance minus r/2, where r is as above 0.1 of the OD distance. The arc 258 of radius R is drawn through the origin region 254 centered at the destination point 252. The arc 260 of radius is drawn the R through the destination region 256 centered at the origination point 250.

When the OD distance is large, the routing module 120 may retrieve the routes that have at least an ending segment falling in the origin region 254 or an ending segment falling in the destination region 256, including reverse routes. When the OD distance is small, the routing module 120 may retrieve the routes that have at least an ending segment falling within the region bounded by the origin region 254 and the arc 258, or an ending segment falling with the region bounded by the destination region 256 and the arc 260.

Figure 7A:
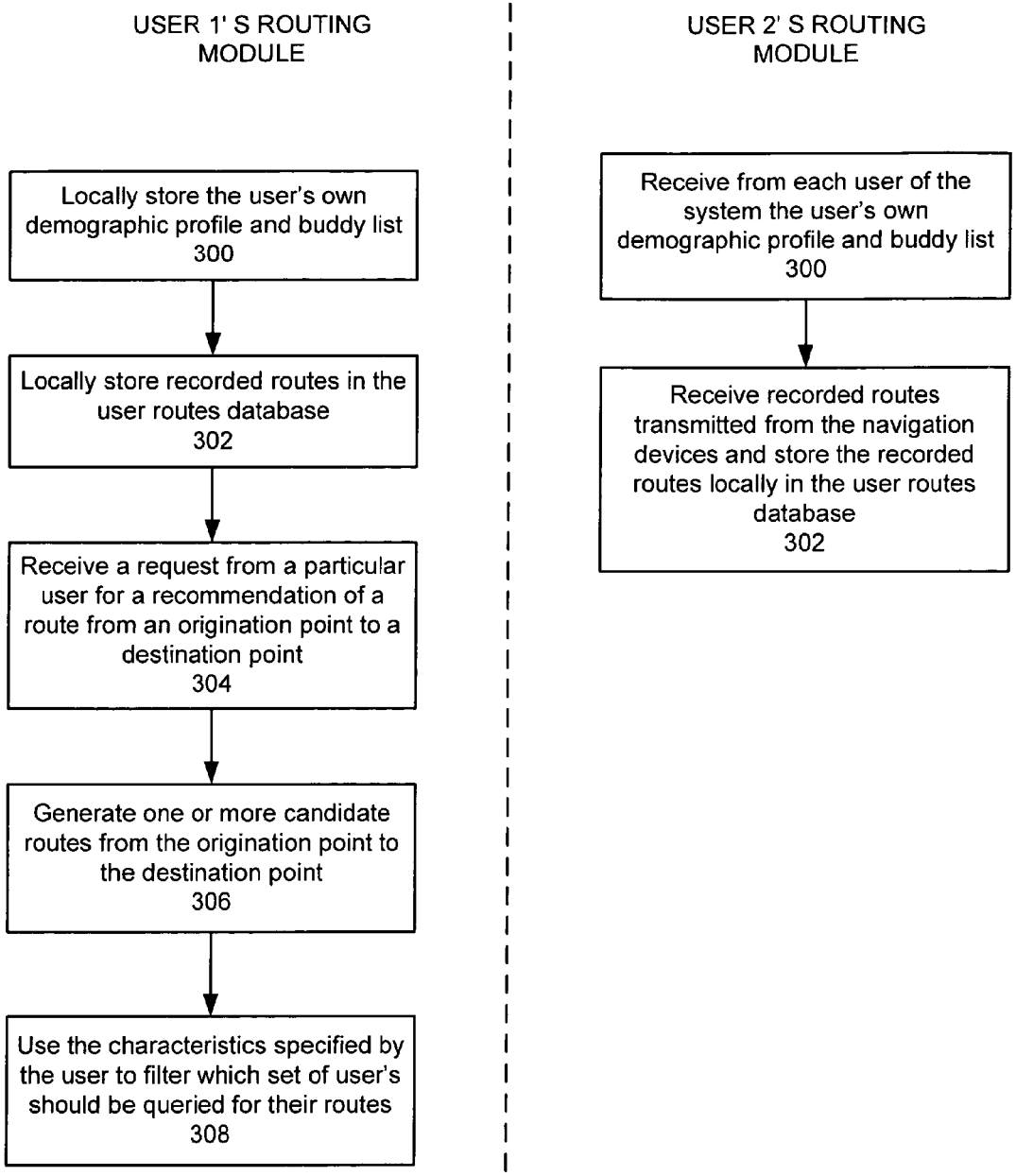
FIGS. 7A and 7B are flow diagrams illustrating the process of selecting and presenting desirable routes to a user in accordance with a peer-to-peer-based embodiment.
Figure 7B:
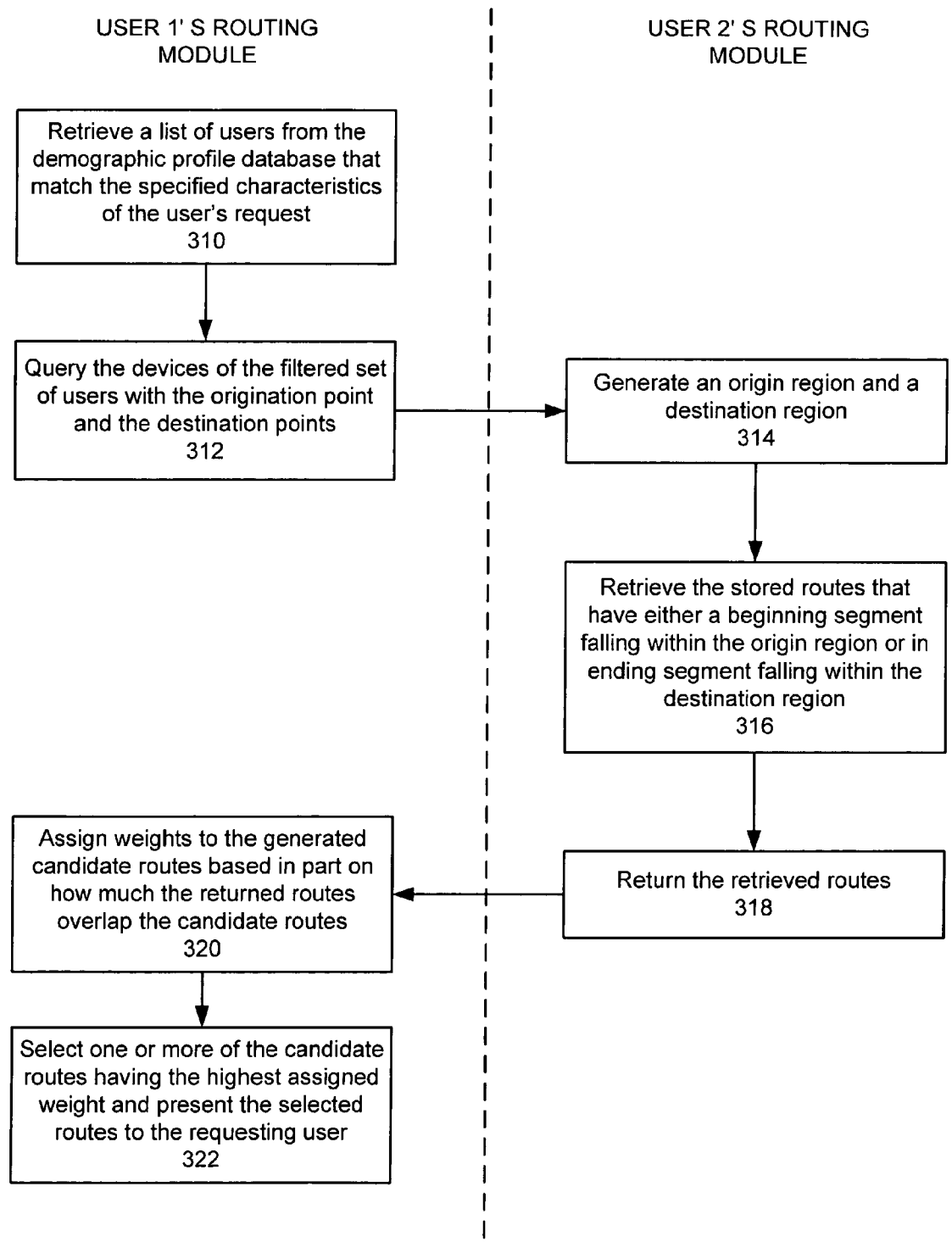

FIGS. 7A and 7B are flow diagrams illustrating the process of selecting and presenting desirable routes to a user in accordance with a peer-to-peer-based embodiment. Referring to both FIGS. 2B and 7A, the process is shown from the point of view of user 1's navigation device and user 2's navigation device. The process begins in block 300 in which the routing module 120' of each of user 1 and 2's navigation devices 102' stores its user's demographic profile, and buddy list, if any, locally in the buddy list and demographic profile database 116'. In block 302, the position module 114' of each of the navigation devices 102' stores recorded routes of its user locally in the user routes database 118'.

In block 304, the routing module 120' receives a request from the user for a recommendation of a route from an origination point to a destination point. In block 306, the routing module 120' generates one or more candidate routes from the origination point to the destination point using conventional route solution techniques. In block 308, the routing module 120' uses the characteristics specified by the user to filter which set of other user's navigation devices should be queried for their routes.

Referring now to FIG. 7B, in block 310, the routing module 120' retrieves a list of users from the buddy list and demographic profile database 116' that match the specified characteristics of the user's request. In block 312, the routing module 120' queries the navigation devices of the filtered set of user, including user 2, with the origination point and the destination point.

In block 314, user 2's navigation device generates an origin region around the origin point and a destination region around the destination point. This step may also include verifying that the request comes from a user who is a member of user 2's buddy list. Alternatively, block 314 may be performed by user 1's device.

In block 316, the routing module 120' of user 2's device retrieves from its route database 118' the stored routes that have either a beginning segment falling within the origin region or in ending segment falling within the destination region. Alternatively, the query may request routes having intermediate segments that pass through the origin region and the destination region. In block 318, the routing module 120' returns the retrieved routes to user 1's navigation device.

In block 320, the routing module 120' of user 1's device assigns weights to the generated candidate routes based in part on how much the returned routes overlap the candidate routes. In block 322, the routing module 120' selects one or more of the candidate routes having the highest assigned weights and presents the selected routes to the requesting user.

The methods described herein can be embodied in executable instructions stored in a computer-readable medium for use by or in connection with an instruction execution machine, system, apparatus, or device, such as a computer-based or processor-containing machine, system, apparatus, or device. As used here, a "computer-readable medium" can include one or more of any suitable media for storing the executable instructions of a computer program in one or more of an electronic, magnetic, optical, and electromagnetic form, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a random access memory (RAM); a read only memory (ROM); an erasable programmable read only memory (EPROM or Flash memory); optical storage devices, including a portable compact disc (CD), a portable digital video disc (DVD), and the like.

A method and system for selecting and presenting multiple routes to the user obtained from the user's peers has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method for selecting and presenting a route to a user comprising:
   storing on at least one of a server and a device a plurality of associations, each association between a route taken by a user and characteristics of the user;
   receiving from a particular user a request for at least one recommended route to a destination point;
   formulating a query based on user specified parameters, including an origination point, the destination point, and characteristics of other users, to obtain routes taken by other users;
   retrieving, in response to the query, from the stored plurality of associations, a plurality of routes taken by other users having at least some of the characteristics of other users and related to at least one of the origination point and the destination point; and
   presenting at least one recommended route to the particular user based on at least one of the retrieved routes that most closely matches the user specified parameters,
   wherein at least one of the preceding actions is performed on at least one of the server and the device.

2. The method of claim 1 wherein formulating the query further comprises: formulating the query based on route parameters, wherein the route parameters include any combination of quickness, personal safety, traffic safety, road conditions, and police activity.

3. The method of claim 1 wherein the characteristics of other users include demographic parameters including any combination of a name, address, sex, age, driving experience, and number of children.

4. The method of claim 1 further comprising allowing each of the plurality of users to specify a group of users with whom the user's routes may be shared and from whom the routes may be requested.

5. The method of claim 1 wherein retrieving the plurality of stored routes in response to the query further comprises:
   generating, by the at least one of the server and the device, one or more candidate routes from the origination point to the destination point; and
   assigning, by the at least one of the server and the device, weights to the generated candidate routes based in part on how much the retrieved routes overlap the candidate routes; and
   wherein presenting at least one recommended route to the particular user based on at least one of the retrieved routes that most closely matches the user specified parameters includes presenting at least one candidate route having the highest assigned weight to the particular user.

6. The method of claim 5 wherein the weight assigned to a particular one of the generated candidate routes is proportional to the distance at least one of the retrieved routes overlaps the particular one the generated candidate routes.

7. The method of claim 5 wherein the weight assigned to the particular one of the generated candidate routes is proportional to a number of street segments the at least one of the retrieved routes overlaps the particular one of the generated candidate routes.

8. The method of claim 5 wherein the weight assigned to the particular one of the generated candidate routes is determined by the at least one of the server and the device by:
   calculating a total distance of the candidate route;
   calculating a total distance that at least one segment of the at least one of the retrieved routes overlaps with a corresponding segment of the candidate route; and
   assigning a value to the weight that is equal to either of the total distance of overlapping segments, or the total distance of overlapping segments divided by the total distance of the candidate route.

9. The method of claim 5 wherein presenting to the particular user the at least one recommended route further comprises selecting at least one of the generated candidate routes having a highest weight.

10. A system for selecting and presenting a route to a user comprising system components including:
    at least one route database component for storing a plurality of associations, each association between a route taken by a user and characteristics of the user;
    a routing module component coupled to the route database for receiving from a particular user a request for at least one recommended route to a destination point, wherein in response to the request, the routing module is configured to:
    formulate a query based on user specified parameters, including an origination point, the destination point, and characteristics of other users, to obtain routes taken by other users;
    retrieve from the stored plurality of associations, in response to the query, a plurality of routes taken by one or more other users having at least some of the characteristics of other users and related to at least one of the origination point and the destination point; and
    present the at least one recommended route to the particular user based on at least one of the received routes that most closely matches the specified parameters,
    wherein at least one of the system components includes at least one electronic hardware component.

11. The system of claim 10 wherein the routing module formulates the query based on route parameters that include any combination of quickness, personal safety, traffic safety, road conditions, and police activity.

12. The system of claim 10 wherein the characteristics of other users include demographic parameters including any combination of a name, address, sex, age, driving experience, and number of children.

13. The system of claim 10 wherein the routing module component is further configured to allow a user to specify a group of users with whom the user's routes may be shared and from whom the routes may be requested.

14. The system of claim 12 wherein the specified group of users comprises a buddy list.

15. The system of claim 10 wherein the router module is further configured to:
    generate one or more candidate routes from the origination point to the destination point; and
    assign weights to the generated candidate routes based in part on how much the retrieved routes overlap the candidate routes; and
    wherein presenting the at least one recommended route to the particular user using at least one of the received routes that most closely matches the specified parameters includes presenting at least one candidate route having the highest assigned weight to the particular user.

16. The system of claim 15 wherein the weight assigned to a particular one of the generated candidate routes is proportional to the distance at least one of the retrieved routes overlaps the particular one the generated candidate routes.

17. The system of claim 15 wherein the weight assigned to the particular one of the generated candidate routes is proportional to a number of street segments the at least one of the retrieved routes overlaps the particular one of the generated candidate routes.

18. The system of claim 15 wherein the weight assigned to the particular one of the generated candidate routes is determined by the routing module by:
   calculating a total distance of the candidate route;
   calculating a total distance that at least one segment of the at least one of the retrieved routes overlaps with a corresponding segment of the candidate route; and
   assigning a value to the weight that is equal to either of the total distance of overlapping segments, or the total distance of overlapping segments divided by the total distance of the candidate route.

19. The system of claim 14 wherein the route module is configured to present to the particular user at least one of the generated candidate routes having a highest weight.

20. A computer-readable medium storing a computer program, executable by a machine, for selecting and presenting a route to a user, the computer program comprising executable instructions for:
   storing a plurality of associations, each association between a route taken by a user and characteristics of the user;
   receiving from a particular user a request for at least one recommended route to a destination point;
   formulating a query based on the request and user specified parameters, including an origination point, the destination point, and characteristics of other users, to obtain routes taken by other users;
   retrieving from the stored plurality of associations, in response to the query, a plurality of routes taken by other users having at least some of the characteristics of other users and related to at least one of the origination point and the destination point; and
   presenting at least one recommended route to the particular user based on at least one of the retrieved routes that most closely matches the user specified parameters.

* * * * *